F. MAIER.
DRILL SOCKET.
APPLICATION FILED SEPT. 22, 1909.
955,650.
Patented Apr. 19, 1910.
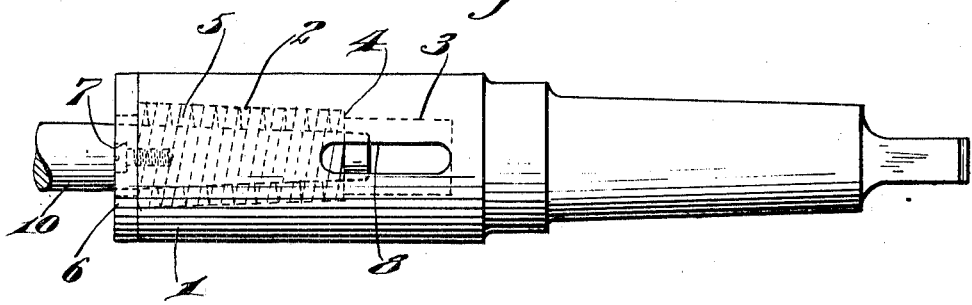
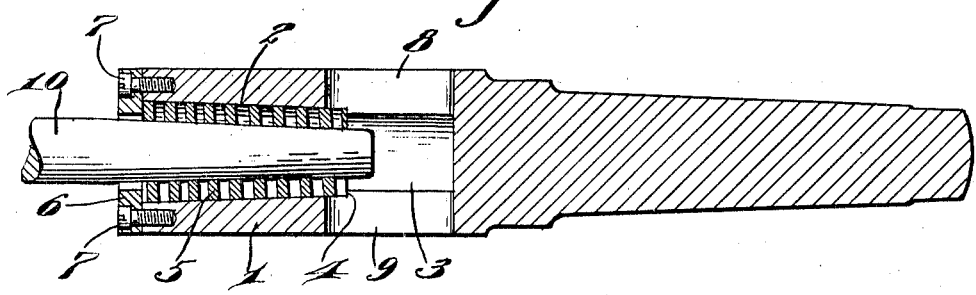
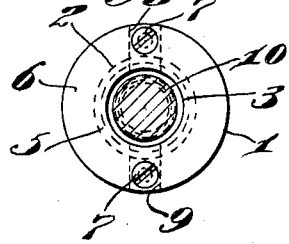
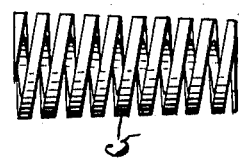
Witnesses
Inventor
Frederick Maier,
By Joshua R. H. Potts
Attorney

UNITED STATES PATENT OFFICE.

FREDERICK MAIER, OF PHILADELPHIA, PENNSYLVANIA.

DRILL-SOCKET.

955,650. Specification of Letters Patent. Patented Apr. 19, 1910.

Application filed September 22, 1909. Serial No. 518,964.

*To all whom it may concern:*

Be it known that I, FREDERICK MAIER, a citizen of the United States, residing at Philadelphia, in the county of Philadelphia and State of Pennsylvania, have invented certain new and useful Improvements in Drill-Sockets, of which the following is a specification.

My invention relates to an improved drill socket, the object of the invention being to provide a device of this kind of extremely simple construction, having a tapering compression bushing adapted to hold the drill, the greater the pressure on the drill, the greater the clamping action of the bushing will be.

A further object is to provide an improved drill socket, which is constructed to withstand very hard usage, which will securely clamp taper shank drills of various kinds, which dispenses with any necessity for driving or hammering the drill into the socket to clamp the same, and which is of extremely simple construction, strong and durable in use.

With these and other objects in view, the invention consists in certain novel features of construction, and combinations and arrangements of parts as will be more fully hereinafter described and pointed out in the claims.

In the accompanying drawings, Figure 1, is a view in side elevation illustrating my improvements. Fig. 2, is a view in longitudinal section. Fig. 3, is an end view of the socket showing the drill in cross section, and Fig. 4, is a view in elevation of the compression bushing removed.

1 represents my improved drill socket, which is provided in one end with a conical or tapering bore 2, which communicates with a cylindrical bore 3 of smaller diameter, forming at the juncture of said bores 2 and 3 an annular shoulder 4.

5 represents my improved compression bushing, which is made tapering, or rather is in the form of a conical or helical coiled spring, which is adapted to fit within the bore 2, with its smaller end bearing against the shoulder 4.

A cap ring 6 is secured to the end of the socket 1 by means of screws 7, and is of an internal diameter less than the larger diameter of the bushing 5, so as to confine the bushing within the tapering bore 2.

8 and 9 are slots registering with the bore 3, and with the inner end of bore 2, and are adapted to receive any suitable tool to compress the bushing 5 longitudinally to release the drill illustrated at 10 whenever desired.

In operation, the tapering drill 10 is inserted within the bushing 5 and the drilling operation begun, the greater the pressure upon the drill, the tighter will the bushing bind the same, for as the drill is forced backward into the bushing, due to the taper of the bushing 5 and the bore 2, the internal diameter of the bushing will be decreased, thus more firmly grasping the drill, as a greater pressure is applied. When it is desired to release the drill, a suitable tool is entered in either of the openings 8 or 9 to compress the bushing 5 longitudinally, to expand the bushing laterally and release the drill. Even though the bushing should break during the operation of drilling, it will hold the drill, and can be easily replaced by simply removing the cap ring 6.

Various slight changes might be made in the general form and arrangements of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. A drill socket and a tapering compression bushing in said socket, consisting of a conical or helical coiled spring.

2. A drill socket having a tapering bore, and a tapering compression bushing, consisting of a conical or helical coiled spring in said tapering bore.

3. A drill socket having a tapering bore, and a cylindrical bore smaller than the smallest diameter of the tapering bore, communicating with the tapering bore, and forming an annular shoulder at the smaller end of the tapering bore, openings in the sides of said socket communicating with said cylindrical and tapering bores, and a tapering compression bushing in said tapering bore having its smaller end against said annular shoulder.

4. A drill socket having a tapering bore, and a cylindrical bore smaller than the smallest diameter of the tapering bore, communicating with the tapering bore, and forming an annular shoulder at the smaller end of the tapering bore, openings in the sides of said socket communicating with said cylindrical and tapering bores, and a cap ring secured to the end of the socket, and of an internal diameter smaller than the diameter of the larger end of the tapering bore, whereby said ring serves to confine the compression bushing in said tapering bore.

In testimony whereof I have signed my name to this specification in the presence of two subscribing witnesses.

FREDERICK MAIER.

Witnesses:
R. H. KRENKEL,
J. A. L. MULHALL.